Jan. 17, 1950     W. T. BROWN     2,494,796
INFLATABLE GAME BALL
Filed June 27, 1946
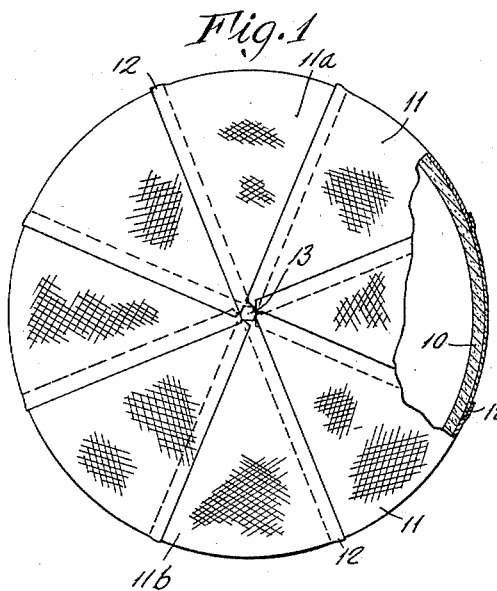
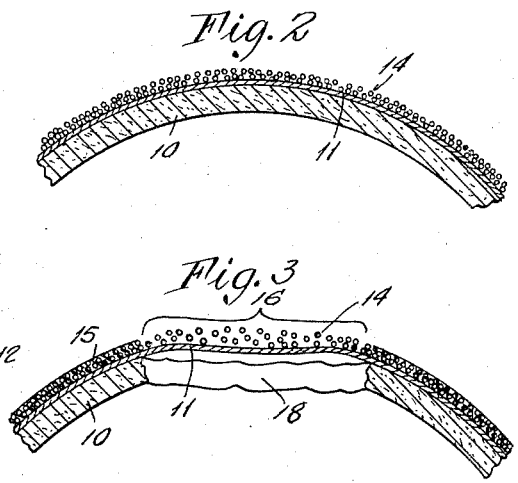
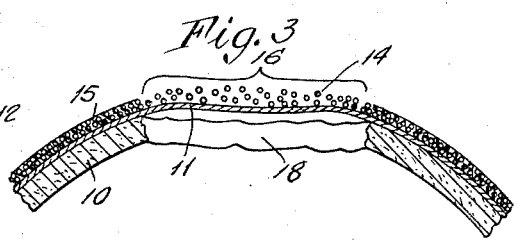
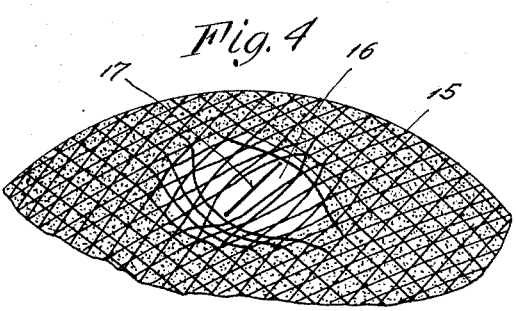
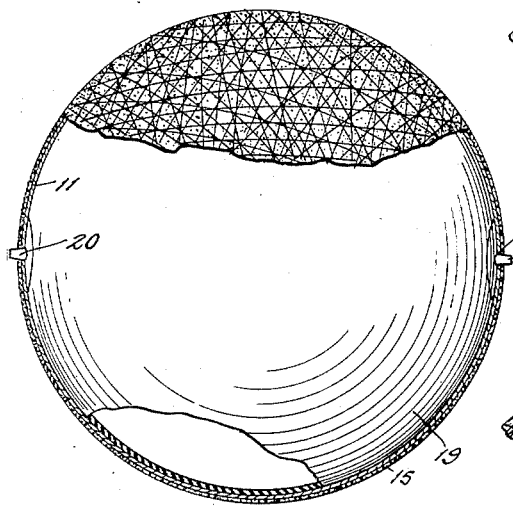
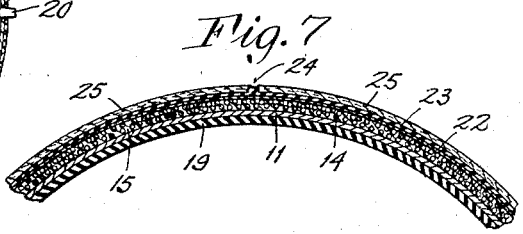
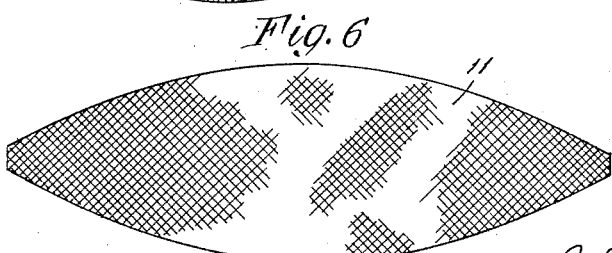
INVENTOR.
William T. Brown
BY
Johnson, Kline and Hensel
ATTORNEYS Patented Jan. 17, 1950

2,494,796

UNITED STATES PATENT OFFICE 2,494,796

INFLATABLE GAME BALL

William T. Brown, West Suffield, Conn., assignor to A. G. Spalding & Bros., Inc., Chicopee, Mass., a corporation of Delaware Application June 27, 1946, Serial No. 679,850

3 Claims. (Cl. 273—65)

This invention relates to improvements in the manufacture of inflatable game balls such as those employed for football, basketball, soccer and the like, said improvements lying in the method of making such balls, and in the structural features thereof.

In the manufacture of game balls of the aforesaid type, it was known to form a laminated carcass of one or more layers of fabric, ordinarily reinforced by one or more layers of cord wound around the same, the laminations being cemented together. An inflatable bladder is inserted in the carcass, and after inflation thereof to expand the carcass to its desired shape, outer covering layers are applied to the outer surface.

In one procedure heretofore suggested, a spherical carcass is formed from two hemispherical halves of flexible non-stretchable material such as canvas or felt, preformed to the desired shape and sewn together at their edges. A deflated bladder is introduced prior to completion of the sewing; whereupon the bladder is inflated and the carcass is wound with reinforcing cord, which is subsequently impregnated or coated with rubber or cement. A disadvantage of this procedure lies in the fact that the shape of the flexible carcass is likely to become distorted during the winding operation, and inflation of the bladder in preparation for winding is likely to cause some stretching, even though the carcass is made of substantially non-stretchable material, resulting in non-uniformity in size of successive balls.

Another method heretofore disclosed involved building up a carcass on a rigid form of reducible (e. g. frangible or fusible) material, capable of preventing distortion during application of windings and laminations thereon. One or more coverings and windings of reinforcing cord are cemented to the rigid form, resulting in a reinforced, substantially non-stretching carcass. The material of the rigid form is then reduced as by crushing or fusion, so as to permit its removal from the interior of the carcass through an aperture formed in a wall thereof. Thereafter, a bladder is inserted through the aperture and inflated, to maintain the carcass in distended condition, and after closing and repairing the aperture, the remaining layers of the cover for the ball are applied. Formation of such an aperture in the carcass however involved cutting through the various layers of reinforcing cord, thus substantially weakening the carcass at the aperture. To minimize this effect, the aperture was formed by cutting out patches of successively increasing size from successive laminations of the carcass on the rigid form, the excised layers being used to form a patch fitting into the resulting opening with the edges of each layer of the patch overlapping the edges of the overlying layer of a carcass lamination to provide substantial surface contact of the patch with the carcass at which the patch could be cemented in place, without thickening the wall of the carcass. The cutting and assembly of the patch to fit into the resulting aperture constituted tedious and expensive operations, and the weakening of the carcass resulting from severance of the reinforcing cords was only partially obviated.

Another difficulty in forming a carcass on a rigid form lay in providing an initial layer of textile material which could conform to the curved surface of the form and at the same time be distributed substantially evenly over its surface. For example, it was suggested to apply a layer of knitted material such as stockinet over the rigid form, stretching it in both directions, and gathering it together at opposite ends. The gathered portions however formed a thickened layer of the material and prevented substantially uniform distribution of the fabric over the surface of the form.

It is an object of my invention to provide a method for making an inflatable game ball on a rigid form of reducible material, wherein the removal of the form material and insertion of a bladder can be effected without severing the reinforcing layer of the carcass and without the necessity of applying a patch for repairing the aperture through which these operations are effected.

Another object of my invention is to provide a method of making a ball of the aforesaid type wherein the layers of fabric are stretchable and at the same time are substantially uniformly distributed over the area of the carcass or form and conforming to the surface of the underlying form.

In connection with the foregoing objects, it is an object of my invention to provide an economical and simplified method of making an inflatable game ball of uniform structure and of reproducing such balls of uniform size.

Still another object is to provide game balls embodying the structural features whereby the foregoing objects are made possible.

In accordance with my invention I provide a rigid form of reducible material having the shape of the interior of the desired ball. The shape of the form may be a sphere for basketballs, or a prolate spheroid for a football. An initial layer of stretchable material is applied to the surface of the rigid form so as to conform thereto and is secured to the form for example by cement. Preferably, in accordance with my invention the initial layer of stretchable material is formed by a plurality of bias cut panels of woven fabric, stretched over the surface of the form and shaped so that their margins overlap slightly but without overlapping of an excessive number of layers where several panels come together, thus avoiding excessive build-up of the thickness of the layer. Over the initial layer of stretchable material, one or more reinforcing layers are formed by winding with cord, which is secured to the underlying fabric layer by cement over substantially the entire surface of the carcass. However, in accordance with my invention a small area or zone of the layers of cord is left uncemented, so that the cords traversing this area are not secured to each other, nor to the underlying layer of fabric. In order to remove the rigid form from the interior of the resulting structure, the cords traversing the uncemented area are pushed aside, and an incision is made through the initial layer of fabric and cement, of sufficient size to permit removal of the material of the form and insertion of a bladder. The material of the form is reduced, for example by crushing or fusion, and removed through the aforesaid incision. An inflatable bladder is then inserted through the incision and positioned with its inflating valve projecting through an aperture ordinarily provided for this purpose in another part of the carcass. The bladder is inflated with air at moderate pressure, sufficient to distend the bladder to fill the interior of the carcass. Cement is then applied to the uncemented area over the incision, thus securing the reinforcing cords in place, in the same manner as over the rest of the surface of the carcass. The cords, being unsevered, provide the same reinforcement over the originally uncemented area including the incision as they do over the rest of the carcass.

The ball can be completed in any desired manner, as for example by cementing to the carcass a layer of rubberized, stretchable fabric, or rubber alone, preferably uncured, molding the rubber to produce the desired surface effect, and if desired, securing a number of panels of outer covering, such as leather or fabric to the rubber surface.

Other features and advantages of my invention will appear from the following description, taken in connection with the accompanying drawings wherein Figure 1 is a plan elevation partly sectioned, of a rigid spherical form for a ball having thereon an initial fabric layer for a carcass.

Fig. 2 is a fragmentary section of the rigid form shown in Fig. 1, having thereon the initial fabric layer and a winding of cords.

Fig. 3 is a fragmentary section similar to Fig. 2, but in which cement has been applied to the reinforcing cords leaving an uncemented area under which the form has been broken away.

Fig. 4 is a fragmentary view in elevation of the surface shown in section in Fig. 3, including an incision for removal of the rigid form, and for insertion of a bladder.

Fig. 5 is a side elevation of the carcass with portions thereof cut away and enclosing an inflated bladder.

Fig. 6 is a detail of a panel employed in forming the fabric layer shown in Fig. 1.

Fig. 7 is a fragmentary section of a finished ball.

Referring to the drawings, I first make a hollow rigid form 10 of wax, or similar material adapted to be reduced by crushing or pulverizing, or if desired, by fusion. An initial layer of stretchable fabric is applied to the surface of the form 10 and held thereon by cement. Preferably this layer is made by application of a plurality of panels 11 of stretchable textile fabric overlapping each other at their margins as shown at 12. For example, the panels can be of 5-oz. duck, or a similar lightweight closely woven textile material, cut on a bias to render the panels stretchable. The panels 11 are advantageously shaped as indicated in Fig. 6, to cover equal segments (for example, eight segments) of the rigid spherical form 10, the material forming the panels being cut on a bias as indicated in Fig. 6 to render them stretchable to conform to the spherical surface of the form 10.

Where the ends of the panels 11 come together, at 13, excessive overlapping which would build up a thickened portion on the surface of the form is preferably avoided by extending the ends of only two opposite panels, for example, 11a and 11b so that they overlap at 13, the ends of the remaining panels 11 being truncated so as to extend only to the edge of the overlapped area. In this way, at most three layers of fabric are superposed at any point adjacent the ends of the panels.

The panels 11 are secured to the form by cement which can be applied either to the form 10 or to the panels or to both. After the cement has dried, the form is wound with reinforcing cord 14, preferably using a continuous strand thereof, wound substantially on great circles but crossing itself to form a network as indicated in Figs. 4 and 5. Thus the layers of cord 14 shown in section in Fig. 2 indicates a section of a network of the type shown in Figs. 4 and 5.

When the winding operation is complete, the layers of cord 14 are impregnated with cement 15 as by dipping, spraying or the like, but leaving an area or zone 16 free of cement, over which the cords 14 are not fastened to each other nor to the underlying fabric 11. When the cement has set, the cords 14 are forced aside over the area 16 and an incision 17 is made in the underlying fabric, of sufficient size to permit removal of the material of the form 10 after reduction thereof, and for insertion of an inflatable bladder. For example, the zone 16 may have a diameter of about 3 or 4 inches, and the incision 17 may be about 1½ to 2½ inches long.

In order to facilitate displacement of the cords 14 over the zone 16, the form 10 can be broken away by pressure or a blow under the zone 16 as indicated at 18, thus releasing the spherically shaped fabric 11 over the broken-away portion 18, and releasing the tension on the overlying cords 14 as shown in Fig. 3. Thus, the cords 14 overlying this area can be readily pushed aside in the manner indicated in Fig. 4 to permit the operator to make the incision 17 in the underlying fabric 11.

The rest of the rigid form 10 is then reduced in conventional manner as by pulverizing the same, and is removed from the interior of the carcass through the incision 17. Another method for reducing the form 10 involves fusion thereof, for example by inserting a steam nozzle into the incision 17, but this method is not as desirable as pulverizing, since it leaves a thin coating of wax on the interior of the carcass.

A bladder 19 having self-closing inflation valves 20 is then inserted into the carcass through the incision 17. The bladder 19 is positioned with its valves 20 extending through conventional apertures 21 provided therefor in the layers of the carcass, preferably equidistant from the pole areas 13 and on opposite sides of the carcass, so as to provide equal distribution of mass and balance.

The bladder 19 is then inflated as shown in Fig. 5, to a moderate pressure sufficient to expand the carcass to its full size but insufficient to cause substantial stretching thereof. The zone 16 is then impregnated with cement to secure the cords 14 firmly to the underlying layer of fabric 11. Since the cords 14 are not severed in making the incision 17, they provide the same reinforcement over the area 16 as over the remainder of the carcass, and prevent separation of the fabric 11 at the incision 17.

The fabric 11 forming a lining for the reinforcing layers of cord 14 covers the interstices between the cords, preventing deformation of the bladder into the interstices, and minimizing rubbing of the bladder against the interior surface of the carcass.

When the layers of cord on the carcass are completely cemented as aforesaid, and the bladder 19 inflated, the remaining laminations of the ball can be applied in any desired manner. In a preferred structure, in accordance with my invention, a layer of stretchable fabric 22 having thereon a thin outer coating of uncured or partly cured rubber 23 is cemented to the surface of the cemented cords 14. The fabric is advantageously applied by cutting the panels thereof of the shape shown in Fig. 6 and applying it in the same manner as the panels 11 to the surface of the carcass. The fabric ordinarily covers any unevenness presented by the surface of the winding cord 14, or individual strands thereof so that the cords do not show through on the outer surface of the ball. Any unevenness showing through the fabric 22 and its rubber coating 23 can be removed by buffing or similar treatment.

The ball is then placed in a mold having grooves in its interior surface corresponding to the seam lines on the outside of the ball, and the ball is subjected in the mold to heat and pressure sufficient to mold the rubber 23, forcing it into said grooves to form ridges indicated at 24. An outer covering is then applied in the form of panels 25, which fit between and abut the ridges 24. These panels may be of leather or any other desired fabric and are secured in place by means of cement to the surface of the rubber layer 23. Preferably the thickness of the panels 25 is greater than the height of the ridges 24, so that the latter constitute grooves in the surface of the finished ball.

If desired, the fabric layer 22 can be omitted, using instead a layer of uncured rubber alone. The latter is applied in the same manner to the surface of the cemented cords 14 and molded in the same manner to form ridges 24 between which the panels 25 are inserted. Or if desired, a layer of rubber can be used to form the entire outer layer of the ball, the rubber being cemented to the cords 14 and molded to simulate the appearance of the leather panels 25 and the seam lines 24.

It will be observed that my invention permits the manufacture of an inflatable game ball on a rigid form, using stretchable fabric for the fabric layers conforming to the surface of the form, and providing substantially uniformly distributed mass over the entire surface thereof. Moreover, in accordance with my invention, an aperture is provided for removing the material of the form without severing the reinforcing winding cord, so that the ball is uniformly reinforced over its entire surface. By provision of a fabric lining for the carcass of the ball, the inflatable bladder lying against the said lining is prevented from entering the interstices of the reinforcing cord layers, and a similar layer of stretchable fabric or rubber on the outside of the windings prevents the latter from showing through to the surface of the ball. The use of a rubber layer as a foundation for the outer panels or as an outer covering permits molding thereof to form seam lines simulating the appearance of a leather game ball of conventional construction.

Variations and modifications may be made within the scope of this invention and portions of the improvements may be used without others.

I claim:

1. An inflatable game ball comprising a hollow inner member of stretchable bias-cut woven fabric, an inflated bladder therein; a layer of reinforcing cord wound around said inner member substantially covering the same and impregnated with cement to secure said layer to said inner member, a superposed layer composed of a plurality of bias-cut sections of stretchable woven fabric secured to the outer surface of said layer of cord; and a cover comprising a layer of rubber overlying the latter layer of stretchable fabric.

2. An inflatable game ball comprising a hollow inner member made up of a plurality of bias-cut segments of fabric having their margins cemented together in overlapping relation; an inflated bladder therein; a layer of reinforcing cord wound around said inner member substantially covering the same and impregnated with cement securing said cord to said inner member; a cover comprising a layer composed of a plurality of bias-cut sections of rubberized stretchable woven fabric overlying said reinforcing cord; and panels of rubber surface material secured to said layer of rubberized fabric.

3. An inflatable game ball comprising a hollow inner member made up of a plurality of segments of bias-cut fabric having their margins cemented together and only two of said segments overlapping at the ends thereof, the ends of the other segments extending to the overlapped area of the first-named segments, an inflated bladder therein, a layer of reinforcing cord wound around said inner member and substantially covering the same, said cord being impregnated with cement securing the cord to said inner member, a cover comprising a plurality of bias-cut segments of stretchable rubberized woven fabric cemented to the surface of said layer of cord; and a cover comprising a plurality of panels of rubber surface material secured to the rubber of said fabric.

WILLIAM T. BROWN.

REFERENCES CITED

The following references are of record in the file of this patent:

UNITED STATES PATENTS

| Number | Name | Date |
| --- | --- | --- |
| 1,458,672 | Witmer et al. | June 12, 1923 |
| 2,129,238 | Riddell | Sept. 6, 1938 |
| 2,194,132 | Voit et al. | Mar. 19, 1940 |
| 2,255,749 | Reach | Sept. 16, 1941 |
| 2,302,985 | Voit et al. | Nov. 24, 1942 |
| 2,352,872 | Voit et al. | July 4, 1944 |
| 2,367,374 | Reach | Jan. 16, 1945 |
| 2,380,370 | Smith | July 10, 1945 |